US010373235B2

(12) United States Patent
Balar et al.

(10) Patent No.: US 10,373,235 B2
(45) Date of Patent: Aug. 6, 2019

(54) TABLE-SIDE INFORMATION DEVICE IMAGING CAPTURE

(71) Applicant: Tabletop Media LLC, Dallas, TX (US)

(72) Inventors: Viren R. Balar, Murphy, TX (US);
Kevin C. Mowry, Lewisville, TX (US);
Jeffrey E. Taylor, Lucas, TX (US);
Christopher M. Wellheuser, Plano, TX (US); Vernon Y. Franklin, Midlothian, TX (US)

(73) Assignee: TABLETOP MEDIA, LLC, Dallas, TX (US)

( * ) Notice: Subject to any disclaimer, the term of this patent is extended or adjusted under 35 U.S.C. 154(b) by 20 days.

(21) Appl. No.: 14/500,068

(22) Filed: Sep. 29, 2014

(65) Prior Publication Data

US 2016/0092965 A1 Mar. 31, 2016

(51) Int. Cl.
*G06Q 30/02* (2012.01)
*G06Q 30/06* (2012.01)
*G06Q 50/12* (2012.01)
*G06Q 30/04* (2012.01)

(52) U.S. Cl.
CPC ..... *G06Q 30/0633* (2013.01); *G06Q 30/0226* (2013.01); *G06Q 30/04* (2013.01); *G06Q 50/12* (2013.01)

(58) Field of Classification Search
CPC ........... G06Q 30/0633; G06Q 30/0226; G06Q 50/12; G06Q 30/04
See application file for complete search history.

(56) References Cited

U.S. PATENT DOCUMENTS

| | | | | |
|---|---|---|---|---|
| 5,949,582 A | * | 9/1999 | Coombs | G02B 27/017 348/E5.09 |
| 6,140,921 A | * | 10/2000 | Baron | G08B 5/36 340/457 |
| 10,033,973 B1 | * | 7/2018 | Shen | H04N 7/186 |
| 10,034,049 B1 | * | 7/2018 | Deephanphongs | H04N 21/44218 |
| 2005/0063569 A1 | * | 3/2005 | Colbert | G06K 9/00275 382/118 |
| 2006/0184800 A1 | * | 8/2006 | Rosenberg | G06F 21/32 713/186 |
| 2009/0012433 A1 | * | 1/2009 | Fernstrom | A61B 5/1112 600/593 |

(Continued)

*Primary Examiner* — Ramsey Refai

(57) ABSTRACT

A pay-at-the-table device is augmented to include an imaging sub-system having one or more image-capture components. A front-facing image sensor records video, or takes still photos. A wide view image sensor/lens captures a view of an entire table (or some portion thereof). When table images are captured by the imaging system, image post-processing is used to ensure that any details that can identify the individual patrons are masked or otherwise obscured; in this way, only generic demographic data (e.g., number of patrons, gender, approximate age, etc.) is captured, and all such data is maintained anonymously and without reference to any payment or other information that might provide the restaurant with the patron's true identity. The image-capture components may also include image sensors enable events (e.g., drinks needing refills, entrée arrival, etc.) to be monitored. An infrared image sensor captures thermal data, which can identify the temperature of the prepared food.

5 Claims, 5 Drawing Sheets

(56) References Cited

U.S. PATENT DOCUMENTS

| | | | |
|---|---|---|---|
| 2012/0232958 A1* | 9/2012 | Silbert | G06Q 30/02 705/7.34 |
| 2012/0321144 A1* | 12/2012 | Choong | G06F 21/32 382/118 |
| 2013/0111519 A1* | 5/2013 | Rice | G06Q 30/02 725/34 |
| 2014/0201015 A1* | 7/2014 | Snyder | G06Q 20/18 705/21 |
| 2015/0228001 A1* | 8/2015 | Woycik | G06Q 30/0268 705/15 |

* cited by examiner

TABLE-SIDE INFORMATION DEVICE IMAGING CAPTURE

BACKGROUND

Technical Field

This disclosure relates generally to mechanisms for enhancing operation of promotion/pay-at-the-table devices that are used in restaurant and hospitality environments.

Background of the Related Art

A system of digital promotion/pay-at-the-table devices is known in the prior art. One such commercial system is the Ziosk, available from Tabletop Media, LLC, of Dallas, Tex.

A Ziosk® device typically is implemented as an apparatus that comprises, within a self-contained housing, a display, a reader, a printer, electronics, and a battery. The housing is configured to position the display to a patron seated at a serving area for order data entry, display of information, and invoicing. A server computer is communicatively coupled to the apparatus over a wireless link and is adapted to transmit a control program to the apparatus, and to transmit the information. A control program executing on the apparatus facilitates order entry, order management, point-of-sale system integration, and pay-at-the-table processing. During the payment workflow, an invoice is displayed, a payment (e.g., via credit card, gift card, pre-paid card or debit card) is received and processed, and the invoice is printed.

By implementing a system of these devices, a restaurant can track useful information, e.g., which food or beverage items are popular, what time-of-day certain items are ordered, and so forth. While such information can be quite useful (for planning and management purposes), restaurants also desire the ability to capture demographic data about their patrons, event data about events occurring at the table, and the like. Patron-specific data typically is only received during the check-out process and only then under secure conditions to ensure that credit card and other personally-identifiable information cannot be captured and maintained by the device. Without the ability to capture demographic data or table event data, the restaurant is unable to take full advantage of the benefits of having a table-side device system. Without such data, for example, it is difficult for restaurant management to focus specials, to develop food or beverage promotions and the like, to identify (and perhaps improve) the patron dining experience, or more generally to know the restaurant's client base.

It would be beneficial to provide a way for a restaurant to capture such demographic and table event data while still maintaining privacy safeguards for the patrons. The subject disclosure herein addresses this need.

BRIEF SUMMARY

According to this disclosure, a promotion/pay-at-the-table device is augmented to include an imaging system having one or more image-capture components. For example, the image-capture components include a front-facing image sensor that is activated by the patron to record video or take still photos, or a wide view (e.g., 180° or) 360° image sensor/lens that with patron consent is activated to enable a view of an entire table (or some portion thereof) to be captured, e.g., for demographic purposes. When table images are captured by the imaging system, image post-processing preferably is used to ensure that any details that can identify the individual patrons are masked or otherwise obscured; in this way, only generic demographic data (e.g., number of patrons, gender, approximate age, etc.) is captured, and such data preferably is maintained anonymously and without reference to any payment or other information that might provide the restaurant with the patron's true identity (unless, of course, the patron provides consent for such capture and use). The image-capture components may also include image sensors that under restaurant control (but, once again, with patron consent) enable events at the table (e.g., drinks needing refills, entrée arrival, etc.) to be monitored. Information derived from such sensors is then processed and fed back to one or more other restaurant systems (e.g., order entry, POS, etc.) to alert kitchen staff or wait staff as necessary. The imaging system may also include an infrared image sensor to capture and record thermal data, which can identify the temperature of the prepared food arriving at the table. The infrared image sensor may also capture images from which coarse patron demographic data, such as number of patrons, estimated age, etc., can be identified.

The foregoing has outlined some of the more pertinent features of the subject matter. These features should be construed to be merely illustrative.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION OF AN ILLUSTRATIVE EMBODIMENT

As noted above, a system of digital promotion/pay-at-the-table devices is known in the prior art. One such commercial system is the Ziosk, available from Tabletop Media, LLC, of Dallas Tex. As noted above, a Ziosk® device typically is implemented as a standalone apparatus that comprises, within a self-contained housing, a display, a reader, a printer, electronics, and a battery. The housing is configured to position the display to a patron seated at a serving area for order data entry, display of information, and invoicing. Without limitation, the device may be built around an ARM Cortex-A8 single core processor and Flash memory storage system. A dedicated 3D graphics engine may be used to drive an 800×400 pixel touchscreen display. Other or future implementations may use different hardware, storage, display and graphics elements. For communication purposes, the device preferably includes an 802.11 wireless card, and a Bluetooth-based wireless transceiver. To provide quick identification of table needs or to request wait staff, one or more multi-colored LEDs are installed at the top of the device. A magnetic strip card reader and receipt printer are included to allow a patron to close a check efficiently and securely. A server computer (not shown) is communicatively coupled to the apparatus, typically over a wireless link, and it is adapted to transmit a control program to the apparatus, and to transmit the information. A control program executing on the apparatus facilitates the invoicing by selectively displaying an invoice on the display, receiving a payment, and providing an indication that a payment has been accepted.

Figure 1:
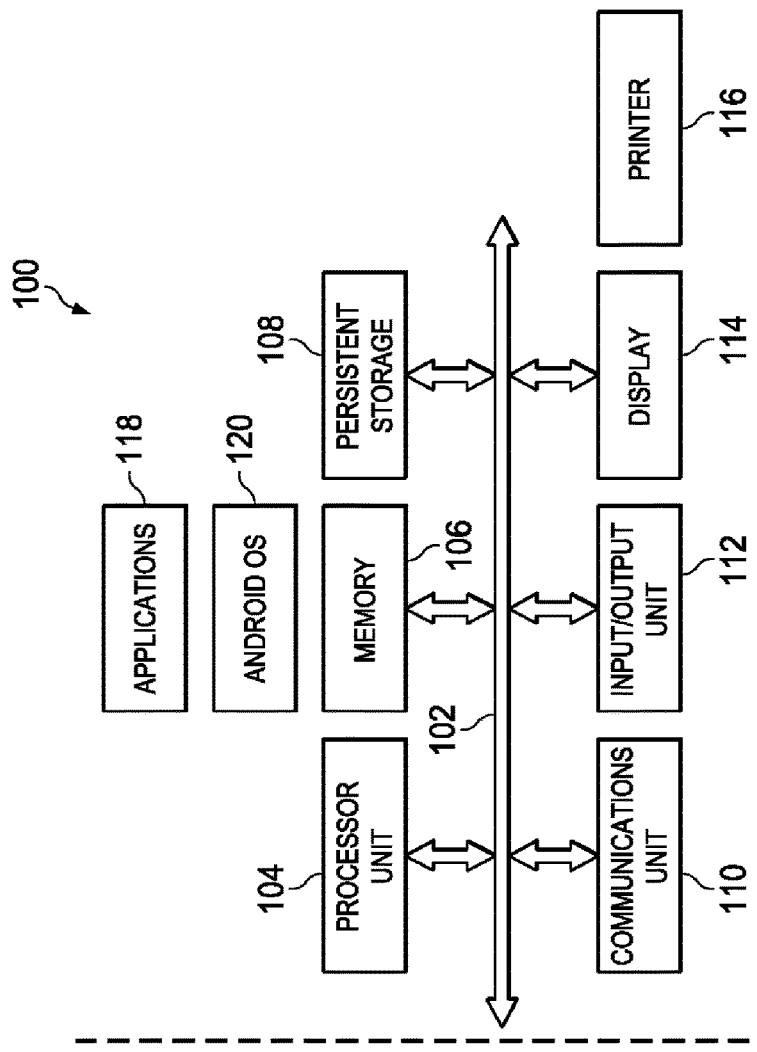
FIG. 1 is a representation of a known table-side device and its control hardware and software.
Figure 1:
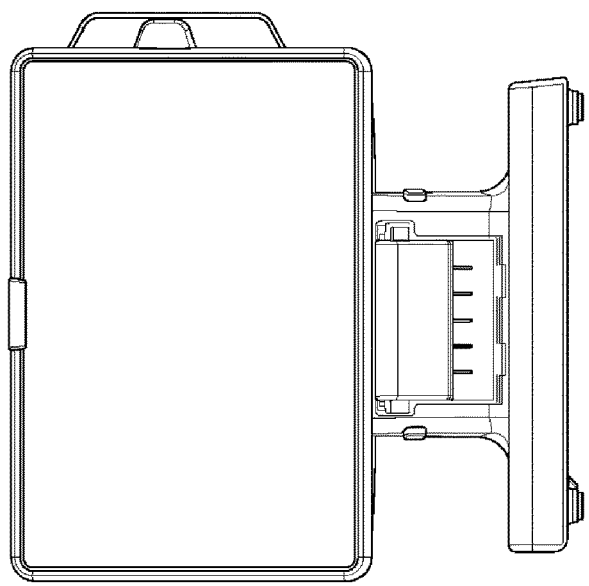

FIG. 1 illustrates a representative architecture for the device 100, which includes a communications bus 102, which provides communications among a processor 104, memory 106, persistent storage 108, communications unit 110, input/output (I/O) unit 112, display 114, and printer 116. The processor 104 executes instructions for software that may be loaded into memory 106 (e.g., from persistent storage 108). The memory 106 and persistent storage 108 are storage devices. The communications unit 110 provides for communications with other data processing systems or devices. In these examples, communications unit 110 is a network interface card, or it may provide communications through the use of either or both physical and wireless communications links. Communications with external devices and systems may occur via LAN, WLAN, Bluetooth, Bluetooth low energy, Near Field Communications (NFC), modem, LTE/4G, Femto-based cells, and any other standards-based or proprietary wired, or wireless communication protocols or technologies, or any combination thereof. Thus, the input/output unit 112 allows for input and output of data with other devices that may be connected to data processing system 100. For example, input/output unit 112 may provide a connection for user input through touch screen, through voice activation, or some other man-machine interface (MMI). Further, input/output unit 112 may send output to the printer 116. Display 114 provides a mechanism to display information to a user. Instructions for the operating system 116 (e.g., Android, Linux, Windows, iOS, or any other, or any combination thereof) and applications or programs 118 are located on persistent storage 108. These instructions are selectively loaded into memory 106 for execution by processor 104.

Figure 2:
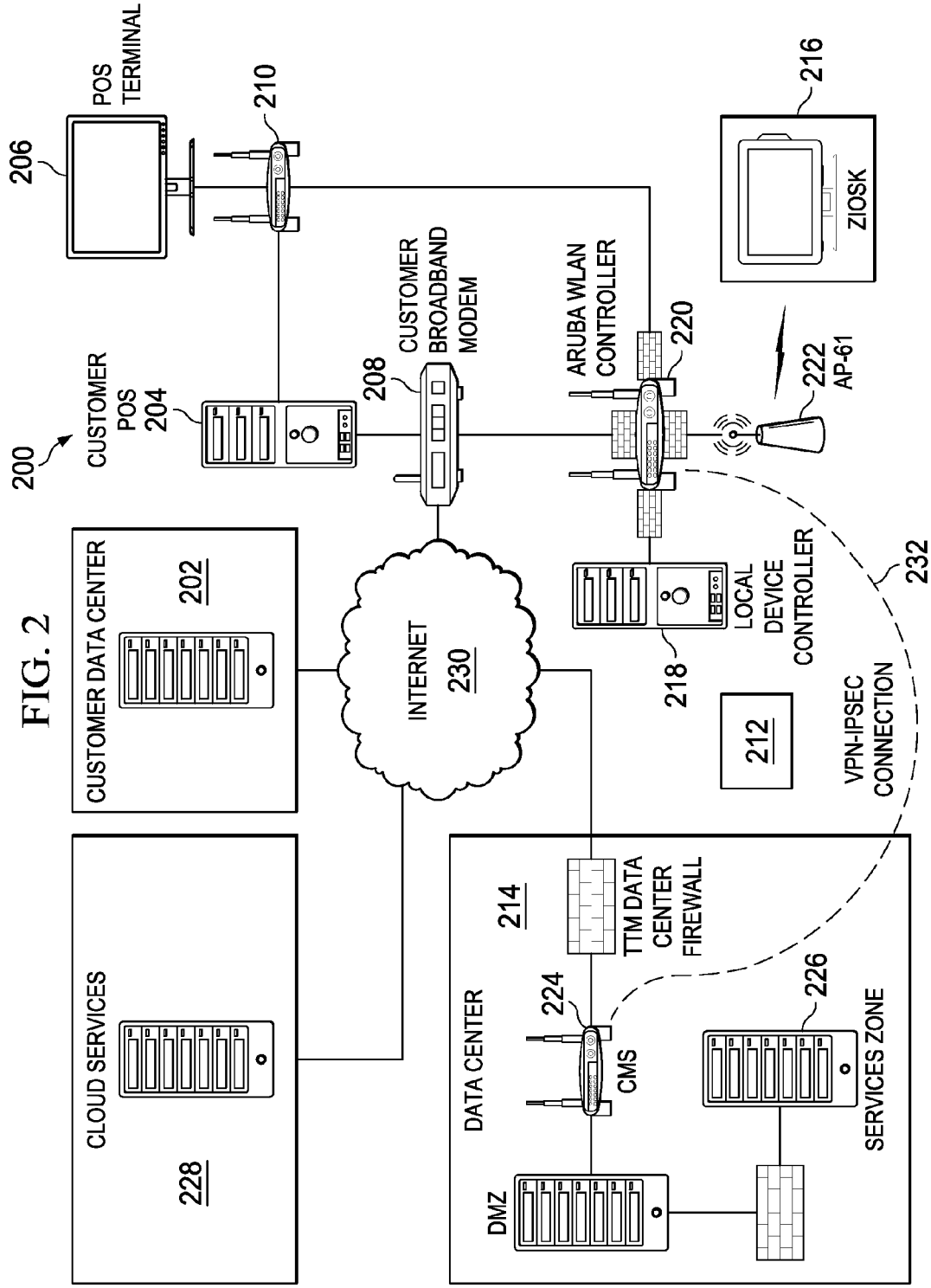
FIG. 2 is a block diagram of a service provider's table-side system that includes a set of such table-side devices and additional devices to interoperate with other restaurant systems.

FIG. 2 shows a representative network for an overall system that, in a typical operating scenario, includes a set of the table-side devices 100 located in a facility (or even across multiple such facilities). A service provider (referred to as "TTM" for convenience) provides various networking, hardware and software resources and services to support the devices within the restaurant (the "customer"). In this embodiment, which is not intended to be limited, the overall system is broken into several portions, namely, the customer's equipment, the service provider's equipment, and other third party services. There may be other implementation scenarios in which various of the components described need not be associated with a customer per se.

With reference to the example implementation shown in FIG. 2, the customer's equipment 200 typically includes a customer data center 202 (which may be located off-premises), a customer point-of-sale (POS) system 204, one or more POS terminals 206, and various networking and switching resources such as DSL modem 208 and switch 210. POS terminals 206 may include any suitable POS terminal, device, tablet, other technologies, or any combination thereof. The DSL modem could include or be any suitable broadband modem, other suitable communication device/system, or any combination thereof. The customer's infrastructure also may include a name service, HTTP and FTP servers, administrative servers, data collection services, management and reporting servers, other backend servers, load balancing appliances, other switches, and the like (not shown). Each machine typically comprises sufficient disk and memory, as well as input and output devices. On the other hand, the service provider's equipment 212 typically comprises a service provider data center 214 located remotely, and various on-site equipment, namely, the table-side devices 216, a local device controller 218, and various wireless networking resources such as WLAN controller 220 and base stations 222 (e.g., an Aruba AP-105, with 802.11 b/g protocol or other wireless standard support). The local device controller operates a proxy server as part of an overall content management sub-system that keeps the table unit software and content updated. The local device controller 218 could include any suitable server, network application, Radius server, FTP server, web server or proxy server, or any combination thereof. The WLAN controller could include any suitable modem controller, switch, or any combination thereof. Base station 222 could include any suitable access points. The content management sub-system periodically polls the external service provider infrastructure (e.g., a content management system therein) for updates. Once an update has been located, it is retrieved to the local device controller where it is stored until the table units are ready (e.g., charged or otherwise available, or if it is otherwise time for the scheduled content to be loaded therein). As the units are charged or after they are charged, the update is downloaded or installed. These updates can range from new menu items to firmware/device operating software upgrades.

As illustrated, the table-side devices 216 communicate wirelessly to the WLAN controller 220 (a wireless router, such as an Aruba 800-4 mobility controller) through the base stations, using known protocols such as 802.11 or other wireless standard. The service provider data center 214 typically supports various servers, such as a content management server 224, and an administration server 226. The data center 214 may also include a name service, HTTP and FTP servers, administrative servers, data collection services, management and reporting servers, other backend servers, load balancing appliances, other switches and modems, and the like. The service provider systems also may interoperate with applications supported in a third party hosted environment 228, such as Amazon® S3 or Web Services, Microsoft® Azure®, other suitable third party hosted services/platforms, or the like. As is well-known, cloud computing using an environment 228 is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Communications among the various systems are facilitated using IP-based networks, such as the public-routable Internet 230, private VPN-IPSEC connections 232, other known or later-developed wireless and/or wireline protocols, and the like.

As noted, the embodiment shown in FIG. 2 is merely representative. The architecture may be implemented in other operating scenarios, e.g., where the data center 202 is associated with a third party or the service provider itself (as opposed to the customer).

Generalizing, various components shown in FIG. 2 may be co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Referring back to FIG. 2, as described, the equipment used by the customer is the customer POS system 204 and associated network connection (e.g., 208, 210). The customer's network connection is then connected to the wireless router 220, which is a central hub of the service provider local (in-restaurant) system. The router 220 communicates with the local device controller 218, the service provider data center 214 and other devices and systems, such as shown. The local device controller 218 typically is a machine on which various application programs execute, as will be described. One of the programs provides local content management and control for the various table-side units. The wireless router 220 (and its associated access point 222) is the link to the table-side units 216 throughout the restaurant or other hospitality area being serviced. The local device controller 218 preferably stores the content and data that is in synchronization with the units 216. The communication link between a unit 216 and its associated local device controller 218 enable each in-restaurant unit to remain up-to-date, and to provide the data center 214 components with the usage and health of the individual units. The customer POS server 204 may also communicate with the content controller routines operative in the local device controller 218.

Imaging Sub-System and Image Capture at the Device

With the above as background, the techniques of this disclosure are now described.

Figure 3:
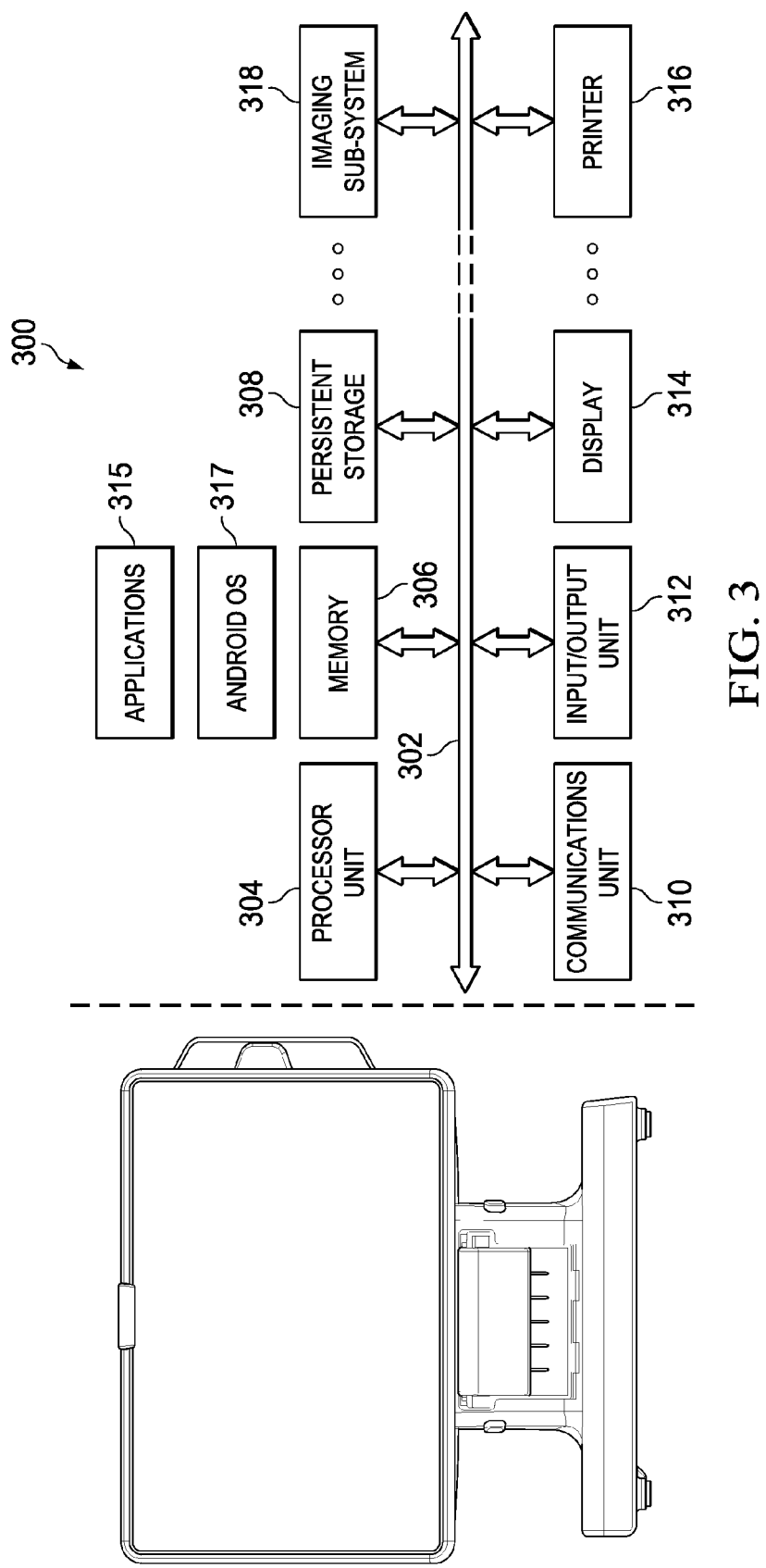
FIG. 3 illustrates the table-side device of this disclosure that includes an imaging sub-system.

According to this disclosure, a promotion/pay-at-the-table device, such as the device shown in FIG. 1, is augmented to include an imaging sub-system that includes one or more image-capture components. FIG. 3 illustrates a representative table-side device that has been augmented to include an imaging sub-system according to this disclosure. As in the FIG. 1 embodiment, the device 300 includes a communications bus 302, which provides communications among a processor 304, memory 306, persistent storage 308, communications unit 310, input/output (I/O) unit 312, display 314, and printer 316. In this embodiment, the device also includes imaging system 318 connected to the processor via the communications bus.

Figure 4:
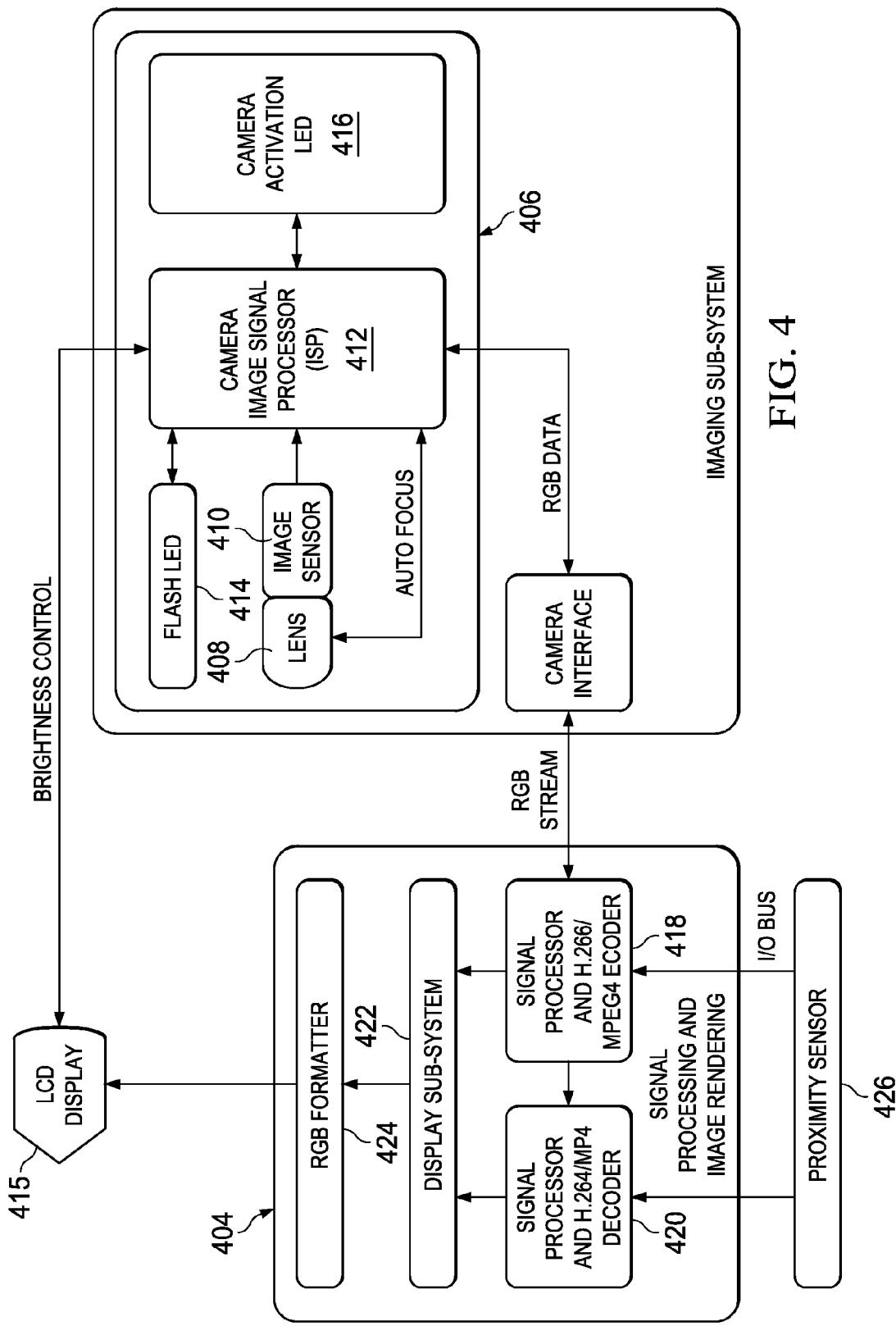
FIG. 4 illustrates the imaging sub-system of the device in additional detail.

FIG. 4 illustrates the imaging system 318 in more detail. In this implementation, the imaging system 400 comprises an imaging subsystem 402, together with a signal processing and image rendering module 404. The imaging subsystem 402 comprises a digital camera module 406 that includes lens 408, image sensor 410, camera image signal processor (ISP) 412, flash LED 414, and camera activation LED 416. The digital camera module 406 may come pre-packaged with these components as an integral unit. The lens 408 and image sensor 410 capture the digital image information, which is then processed by the camera image signal processor 412 into RGB data representing the image itself. The camera activation LED 416 is illuminated when the camera is activated to capture a digital image (or a video), and the flash LED 414 is used to illuminate the scene where necessary. The captured image (in the form of the RGB data) may then be stored, or (when video is captured) the image data may then be processed through a camera interface 418 to generate an RGB stream. That stream may then be fed to the signal processing and image rendering module 404. That module includes a set of components, such as a signal processor/encoder 418, a companion signal processor/decoder 420, a display subsystem 422, and an RGB formatter 424. The signal processor/encoder 418 and signal processor/decoder may process captured video image data according to known protocols/technologies such as H.264/MPEG4. The video may then be displayed on the device itself by being passed to the display subsystem 422 and RGB formatter 424. In the alternative, the video may be stored on the device.

The camera activation LED 416 (or other light emitting source), when enabled (in a steady or flashing mode) indicates that the camera is in use (or about to be in use). This LED can be any suitable intensity, color, size, shape, configuration, or any combination thereof. The Flash LED 414 could be any suitable LED (or other light emitting source) that when enabled (in a steady or flashing mode) provides additional ambient light to the table or surrounding environment, at a particular guest at the table, at a particular group of guests, or any combination thereof. The Flash LED can be any suitable intensity, color, size, configuration, or any combination thereof. The operation of the Flash LED also may be customized to complement the ambient environment (low lighting, yellow lighting, fluorescent lighting, etc.) to provide optimal lighting to take a photo or video, to customize a photo/video effect, or to focus on a particular subject, background, foreground, ambient environment, or any combination thereof.

As also shown in FIG. 4, the camera image signal processor 412 can provide brightness control signals to the LCD display (415) to control the brightness (and perhaps contrast) of the displayed image. The brightness or intensity of the LCD display screen can be used to provide additional ambient lighting to the table or surrounding environment, to a particular guest at the table, to a particular group of guests, or any combination thereof. To this end, the brightness or intensity may be customized as needed in intensity, color, size, shape, configuration, or any combination thereof. In addition, the brightness or intensity of the display screen also may be customized to complement the ambient environment (low lighting, yellow lighting, fluorescent lighting, etc.) to provide optimal lighting to take a photo or video, to customize a photo/video effect, or to focus on a particular subject, background, foreground, ambient environment, or any combination thereof.

Figure 5:
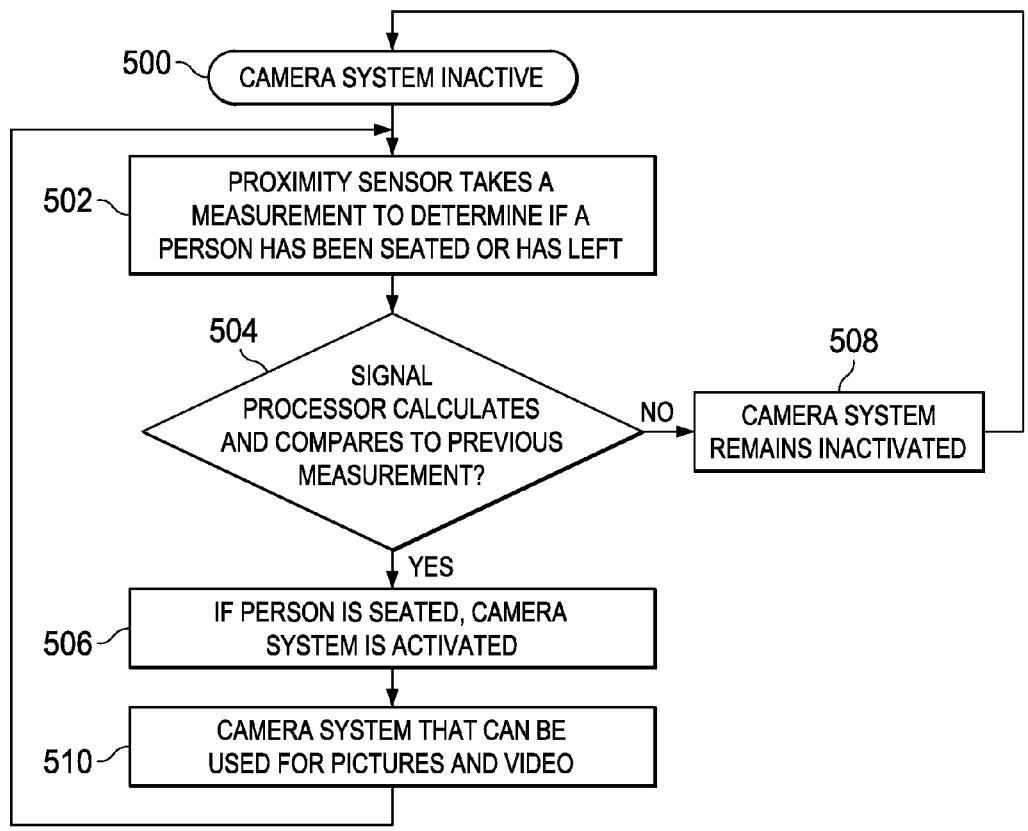
FIG. 5 illustrates a process flow to control the camera system based in part on sensing presence or absence of an individual at a table.

The system also preferably responds to a proximity sensor 426 that is connected via the I/O bus to provide "presence" signaling that activates or de-activates the camera system in response to detection of one or more patrons. FIG. 5 illustrates a process flow of a representative implementation of the patron presence detection function. By default, the camera system is inactive, as illustrated by step 500. At step 502, the proximity sensor takes a measurement to determine if a person (patron) has been seated or has left. The proximity sensor data is then passed to one of the signal processors in the signal processing and image rendering module 404, which signal processor then calculates and compares the received data to one or more previous measurements. This is step 504. By comparing the receiving proximity sensor data with stored data (representations derived from prior proximity measurements), the signal processor can determine whether the proximity data represents a patron (or not). If the proximity data provided by the sensor is found by the signal processor to represent the presence of a patron, the camera system is activated at step 506; if, however, the proximity data does not indicate the presence of a patron, the camera system remain inactive at step 508 (and the routine cycles as shown). At step 510, the camera system is then used, e.g., to capture still or video images.

Because LCD display screens use lots of power, preferably the display screen 415 (FIG. 4) can operate in a power saving mode. The screen is programmed to turn up intensity automatically, preferably when the proximity sensor 426 and associated signal processing circuitry senses a guest at the table and the camera is in operation (or about to be used to take a photo/video). The proximity sensor/signal processing circuitry can automatically adjust the intensity of the LCD display screen and/or the LED Flash to customize the desired lighting color, clarity, intensity, effect, or any combination thereof for the finished photo/video.

The signal processing and image rendering module (and, in particular, the signal processor(s) therein), may also include the capability to perform one or more sophisticated imaging operations, such as real-time table event detection (e.g., whether a drinking glass is empty, food is on the table, the number of patrons on the table, or a patron has just joined or left the table), image database comparison, facial recognition, demographic/age/gender/ethnicity/demographic prediction or identification, and the like. Typical image processing activities (e.g., correction for white noise, redeye, empty space noise, auto-focus, etc.) are carried out by the ISP on the camera module 406.

In a representative embodiment, the camera system comprises one or more image-capture components, together with one or more image capture processing routines that are typically implemented in software, in firmware, or in specialized hardware such as field programmable gate arrays FPGAs) or the like. A typical use case is that shown in FIG. 4, wherein the lens is front-facing and includes the front-facing image sensor 410. As noted, preferably the camera may capture video, or still images, or both. The lens could be a back-facing or a wide-angle lens. Video or still photos captured by the image sensor may then be forwarded, e.g., by email, by SMS/MMS, or posted to a social media site, such as Facebook or Twitter, or the like. All such activities preferably take place under patron control (which may be optional), and preferably after the proximity sensor function has determined the presence of one or more patrons. Thus, and once the camera system is automatically activated by the presence detection function described in FIG. 5, the patron may be provided an option (from the display screen of the device) to capture the view, and forward the image or video, as described. At the point of image capture, the patron also may be provided with an option to allow the captured image data to be saved by one or more restaurant systems.

As noted above, preferably image capture is carried out with patron consent (for ensuring privacy and compliance with other laws and regulations), but this is not a requirement, as there may be operating scenarios where users consent in advance, where consent is optional, or where the nature of the use does not implicate privacy concerns.

Figure 6:
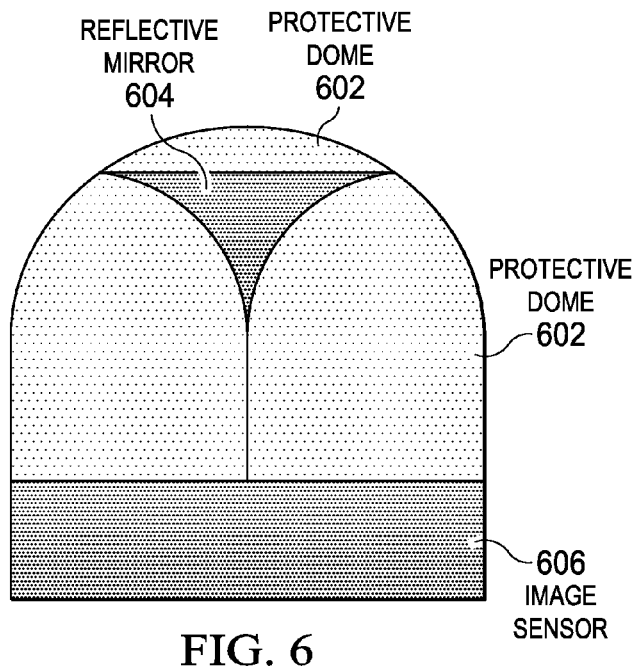
FIG. 6 illustrates a 360° camera lens that may be used in the imaging system of this disclosure.

In an alternative embodiment, the image-capture components also include a wide view (e.g., 180° or 360°) image sensor/lens. This lens may be activated (once again, preferably with patron consent, which is optional) to enable a view of an entire table (or some portion thereof) to be captured for demographic purposes. In one approach for 180° capture, the image sensor/lens is a fisheye lens. A fisheye lens captures the image, typically with a slight circular distortion around the edges of the image. In the alternative, for 180° capture the image sensor/lens is a panoramic lens, together with a simulated rectangular plate that picks up the image captured by the panoramic lens with an angle of the image causing the only distortion. Regarding of which image capture approach is used, preferably one or more image processing components in the device shift the captured image appropriately to correct for any distortion. For 360° image capture, and as shown in FIG. 6, preferably the lens 600 is a sensor having a mirrored reverse dome surface 602 that includes a reflective mirror 604 that points toward a lens of an image sensor 606. The 360° sensor preferably is positioned at a top of the table-side device to provide imaging of the entire table (as well as the area around the table). The mirror may also capture additional light under normally dim light conditions such that the resulting image captured may have higher resolution. In this approach, the image sensor/lens provides for wide angle capture of the image.

The 360° camera enables panoramic/stretch imaging videos, as well as other possible visual effects that may not be possible with one or multiple cameras. An alternative embodiment uses a two (2) camera system, wherein there are pair of camera modules each as described above. A two-camera system enables 3D imaging/videos, and/or additional visual effects that may not be possible with just a single camera embodiment. Although now shown, a hardware or software-based filtering system may be included in the camera system as well.

The image-capture components may also include one or more other image sensors that under restaurant control (but with patron consent, which is optional) enable events at the table (e.g., drinks needing refills, entrée arrival, etc.) to be monitored. As noted above, preferably the signal processing and image rendering module includes one or more signal processors to capture and process that table event data. Information derived from such sensors is then processed and fed back to one or more other restaurant systems (e.g., order entry, POS, etc.). Thus, for example, through the image processing software, the image sensors can monitor the level of drinks on the table and alert the wait staff when the level in a patron's glass goes below a threshold. In addition, as appetizers or entrées arrive at the table and are consumed, the system can alert the wait staff (e.g., through on-board LEDs, point-of-sale (POS) alerts, or the like), provide information that is relayed back to kitchen display systems, alert the hostess (that the table may soon be vacated), or the like. More generally, the information obtained by the image capture sub-system enables the restaurant (and its other internal systems) to track the status of the table management.

The imaging sub-system may also include an infrared image sensor to capture and record thermal data, which can identify the temperature of the prepared food arriving at the table. The infrared image sensor may also capture coarse patron demographic data such as number of patrons, estimated age, etc.

When table images are captured by the imaging sub-system, preferably image post-processing is used to ensure that any details that can identify the individual patrons are masked or otherwise obscured; in this way, only generic demographic data (e.g., number of patrons, gender, approximate age, etc.) is captured, and all such data is maintained anonymously and without reference to any payment or other information that might provide the restaurant with the patron's true identity (unless, of course, the patron provides consent for such capture, with such consent being optional as described above).

Because lighting conditions in a restaurant vary greatly and/or are often non-optimal, image sensors used in the imaging sub-system preferably incorporate larger pixel sizes to allow capture of a larger amount of light on a sensor. Additionally, and to enhance the imaging, preferably the sub-system includes the light element 414 (e.g., a light emitting diode, or Flash LED) that is used as a flash to brighten the subject(s) being captured. Also, during image capture preferably the device's normal display (typically an LCD panel) is brightened under ISP control, e.g., by changing to a white background. These techniques enhance the lighting conditions at the table to facilitate improved data capture.

The device-based imaging sub-system as described above preferably is used to capture restaurant demographic information; the processing of such data provides the restaurant operator (and other permitted entities) significant insight into the cliental of the restaurant. This can be achieved through many different methods such as described above. A preferred approach is to use the thermal image sensor to gather demographic information such as gender, height, weight, and appropriate age (e.g., adult, teen, infant, etc.). With patron consent (which is optional), facial recognition software running on the device (or otherwise in the system) may be used to gather additional patron-specific demographics for regular customers; in this way, the system may alert the kitchen or the wait staff to begin preparation of some item(s) that a regular patron (based on past experience) will order. In this scenario, the system may recognize the patron as soon as he or she sits down at the table, thereby alerting the kitchen to begin preparation of that patron's usual order. Although by default the imaging systems in the device maintain patron anonymity, as noted this is not a limitation. With patron consent (which is optional), demographic information may also be associated to the POS check for the table. This provides significant advantages over the current method for collecting restaurant demographic data, which relies upon the wait staff to input (with the check and order information) whatever information he or she can remember.

The photos/videos taken by patrons (guests) enable "selfie" and group pictures to be taken, emailed to any location, printed (e.g., on location, at the restaurant) or at a third party location, augmented (e.g., by a guest or the restaurant adding special effects via filtering, graphics, text, messages, colors, etc.).

When the table event or thermal sensors operate, the resulting image data may be processed and re-displayed (perhaps with customized borders, logos, filtering, graphics, messages and text) on the device display. In like manner, the resulting image data may be provided back to the restaurant POS system to identify food/beverage items purchased, and that system may augment or supplement its output (e.g., an invoice) to include such customized information. In this manner, the imaging system provides input information to other restaurant systems to facilitate a more custom (unique) experience for the patrons.

Another benefit of using image capture is to facilitate loyalty and customer incentive programs. A restaurant patron can use the image sensor to capture a facial image, which can then be stored and used to recognize the same patron when he or she returns. Or, the image sensor can be used by the patron to capture a bar code or a Quick Response (QR) code, e.g., on the back of a loyalty card, or on the display of the patron's mobile phone. This loyalty information can then be used by the device to provide a pre-configured list of previously- or favorite-ordered items, daily specials, and the like.

The restaurant may aggregate image data captured from multiple table-side devices for demographic and other table management purposes.

In addition, preferably the image sensors and touchscreen of the table-side device include appropriate processing routines to recognize written characters and gestures. An example of this would be a patron using the image sensor to read information of a non-bar coded loyalty card and then updating the information on the device. This provides the patron with the ability to customize the device for their future visits. The gesture recognition also allows all the members of the table to participate in games, trivia and surveys.

The device may also include video conferencing software (e.g., Vidyo) to enable users of the device to videoconference with other similarly-provisioned units in the restaurant, units at other venues, and other outside videoconferencing services. This feature preferably uses the front facing image sensor for video capture at the table. As noted, preferably the devices contains a Bluetooth transmitter and receiver that can be utilized to share document and photos on the display screen and videoconference program.

An ancillary but potentially important benefit of image capture by the device is that it provides for enhanced security for the table-side device itself. Thus, for example, in the unlikely event that the device is taken from the table, one or more security protocols can be activated. For example, a first protocol is activated when the device is removed from an active zone of use, in which case the image sensors in the device are then automatically activated to begin capturing images that are sent to a data center, thereby identifying the security breach. The system likewise may be activated to capture images when the restaurant is closed; thus, the system may capture criminal activity. In one embodiment, when perimeter security in the restaurant is breached, the device imaging sub-system may be automatically activated to record video and take images. This security protocol can provide police with valuable photographic evidence that can aid in the recovery of stolen property or investigations into any crimes committed on the restaurant premises.

Thus, in general multiple images taken across multiple table-side devices at a location may be accessed in real-time or later, and these images may be used for various purposes such as security, tracking/assessing guest location, activity, assessing/monitoring table placement of devices, and assessing/mapping of restaurant size, table configuration, guest preferences, and the like.

Preferably, each of the described image processing functions is implemented in software, as a set of computer program instructions, executing in a single- or multi-processor hardware environment, in firmware, or in dedicated hardware. Thus, a particular functionality may be implemented as a non-transitory computer program product (an article) comprising computer-readable media having computer program instructions thereon.

Communication networks used to communicate to and from the device and other associated systems may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like. While the disclosed subject matter has been described in the context of a method or process, the subject disclosure also relates to apparatus for performing the operations herein. This apparatus may be specially constructed for the required purposes, or it may comprise a general-purpose computing entity selectively activated or reconfigured by a stored computer program stored. Such a computer program may be stored in a computer readable storage medium, such as, but is not limited to, any type of disk including an optical disk, a CD-ROM, and a magnetic-optical disk, flash memory, a read-only memory (ROM), a random access memory (RAM), a magnetic or optical card, or any type of non-transitory media suitable for storing electronic instructions.

While given components of the system have been described separately, one of ordinary skill will appreciate that some of the functions may be combined or shared in given instructions, program sequences, code portions, and the like. Without intending to be limiting, a preferred front-facing image sensor is a Model YB48303H7-V1.0 offered commercially by Shenzhen Younuo Optoelectronics Technology Co. Ltd., or a Model OV097120V28A offered commercially by OmniVision. Of course, these are merely representative implementations and should not be taken to limit the scope of the subject matter as claimed below.

The techniques herein generally provide for the above-described improvements to a technology or technical field, as well as the specific technological improvements to table-side patron-based order entry and information display appliances, such as described above.

Having described our invention, what is claimed is as follows:

1. A table-side user terminal comprising:
a display screen;
a proximity sensor configured to detect a person proximate the user terminal;
an imaging system configured to capture image data of persons and objects proximate the user terminal, wherein the imaging system comprises a lens mounted on a top of the table-side user terminal and configured to capture a panoramic view around the table-side user terminal, the lens comprising a dome surface and a reflective mirror that directs light toward an image sensor positioned beneath the lens;
a controller coupled to the proximity sensor and the imaging system, wherein the controller is configured to:
detect a presence signal from the proximity sensor and, in response, compare current measurement data received from the proximity sensor to previous measurement data received from the proximity sensor;
in response to the comparison, determine if a person is proximate the user terminal; and
in response to a determination that a person is proximate the user terminal, cause the display screen to exit a low power mode and increase a brightness of the display screen,
wherein the controller is further configured to cause the imaging system to capture an image of the person proximate the user terminal.

2. The table-side user terminal as described in claim 1, wherein the controller generates a prompt message that is displayed on the display screen to prompt the person proximate the user terminal for permission to capture the image of the person.

3. The table-side user terminal as described in claim 2, wherein the captured image data is one of a video or a still photograph.

4. The table-side user terminal as described in claim 2, wherein the controller forwards the captured image from the user terminal to a social media site.

5. The table-side user terminal as described in claim 1, wherein the controller comprises a signal processing and image rendering module coupled to the proximity sensor and the imaging system and configured to perform a facial recognition operation on the captured image of the person proximate the user terminal and is further configured to determine at least one of: i) a gender, ii) an age, or iii) an ethnicity of the person proximate the user terminal.

* * * * *